United States Patent [19]

Beomont

[11] Patent Number: 4,985,696

[45] Date of Patent: Jan. 15, 1991

[54] ELECTRONIC CONTROLLER BY RESISTIVITY OF WATER-OIL INTERFACE

[75] Inventor: Jorge J. Beomont, Campo Morichal, Venezuela

[73] Assignee: Lagoven S.A., Caracas, Venezuela

[21] Appl. No.: 932,855

[22] Filed: Nov. 20, 1986

[51] Int. Cl.⁵ .................. G08B 21/00; G01F 23/00
[52] U.S. Cl. ................................. 340/618; 340/620; 73/304; 73/304 R; 73/61 R; 210/519
[58] Field of Search .............. 340/618, 620; 73/61 R, 73/304 C, 304 R; 210/519

[56] References Cited

U.S. PATENT DOCUMENTS

| | | | |
|---|---|---|---|
| 3,626,399 | 12/1971 | Akeley | 340/618 |
| 3,704,724 | 12/1972 | Holbrook | 340/618 |
| 4,304,132 | 12/1981 | Snaper | 73/61.1 R |
| 4,459,584 | 7/1984 | Clarkson | 340/618 |
| 4,637,254 | 1/1987 | Dyben | 340/624 |
| 4,638,305 | 1/1987 | Sutton | 340/620 |
| 4,722,800 | 2/1988 | Aymong | 210/519 |

Primary Examiner—Joseph A. Orsino
Assistant Examiner—Kinfe-Michael Negash
Attorney, Agent, or Firm—Beveridge, DeGrandi & Weilacher

[57] ABSTRACT

An electronic interface controller is disclosed. The controller is particularly suited for use in controlling dehydration processes of light, heavy and extra heavy crude oils on the basis of the interface between the oil and water. The controller includes sensor elements which generate a signal representative of current flow between the sensors to indicate the conductivity of liquids between the sensors. A first device, responsive to a current flow signal from the sensors, generates a control signal according to the conductivity of liquid in contact with the sensors. A timer is provided for delaying a control signal generated by the first device for a delay period between 0 and 180 seconds. First and second comparing devices are each responsive to a current flow signal from the sensors to respectively generate a high interface level alarm signal when the conductivity of liquid in contact with the sensors exceeds a predetermined high value and to generate a low interface level alarm signal when the conductivity is below a predetermined low value.

7 Claims, 8 Drawing Sheets

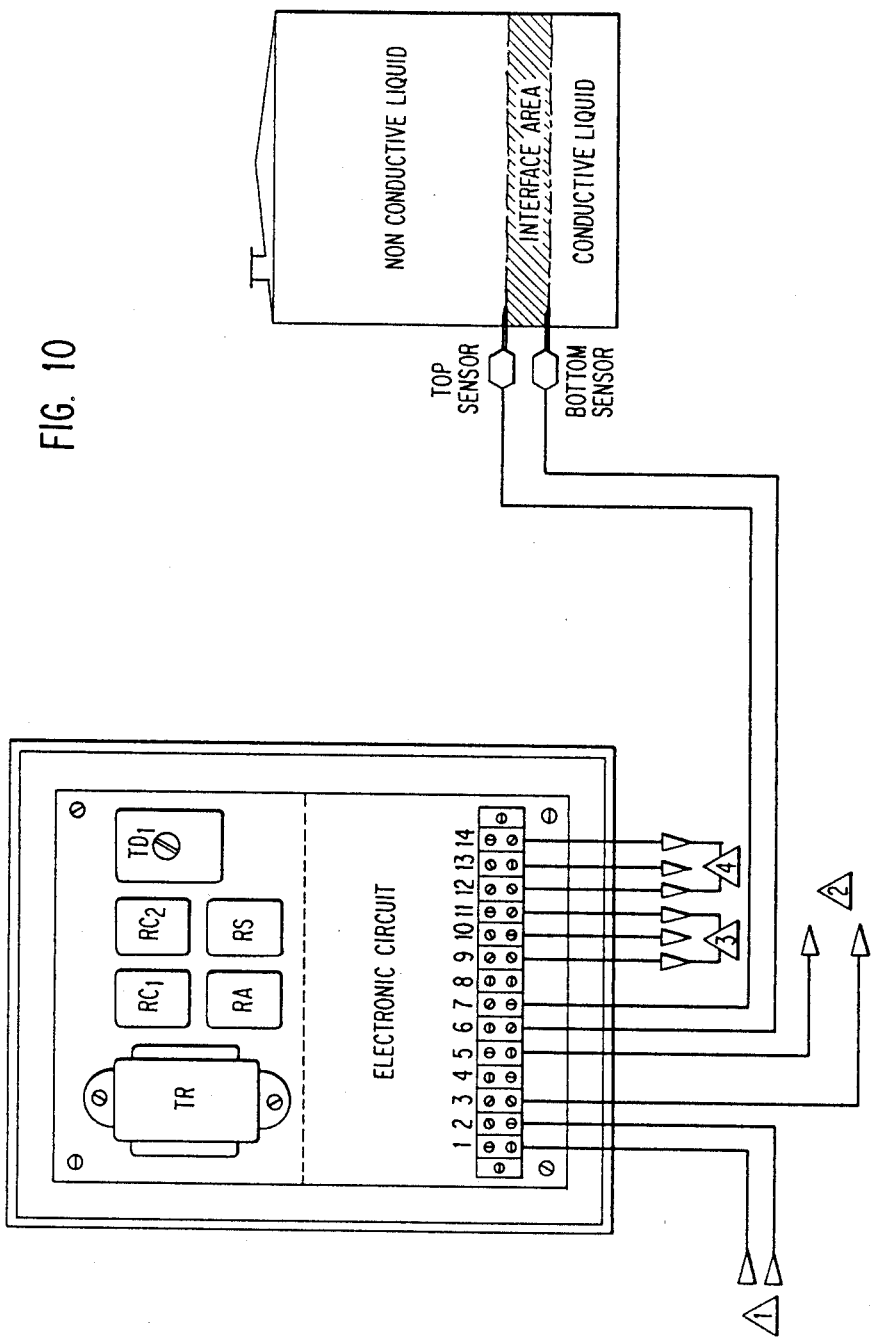

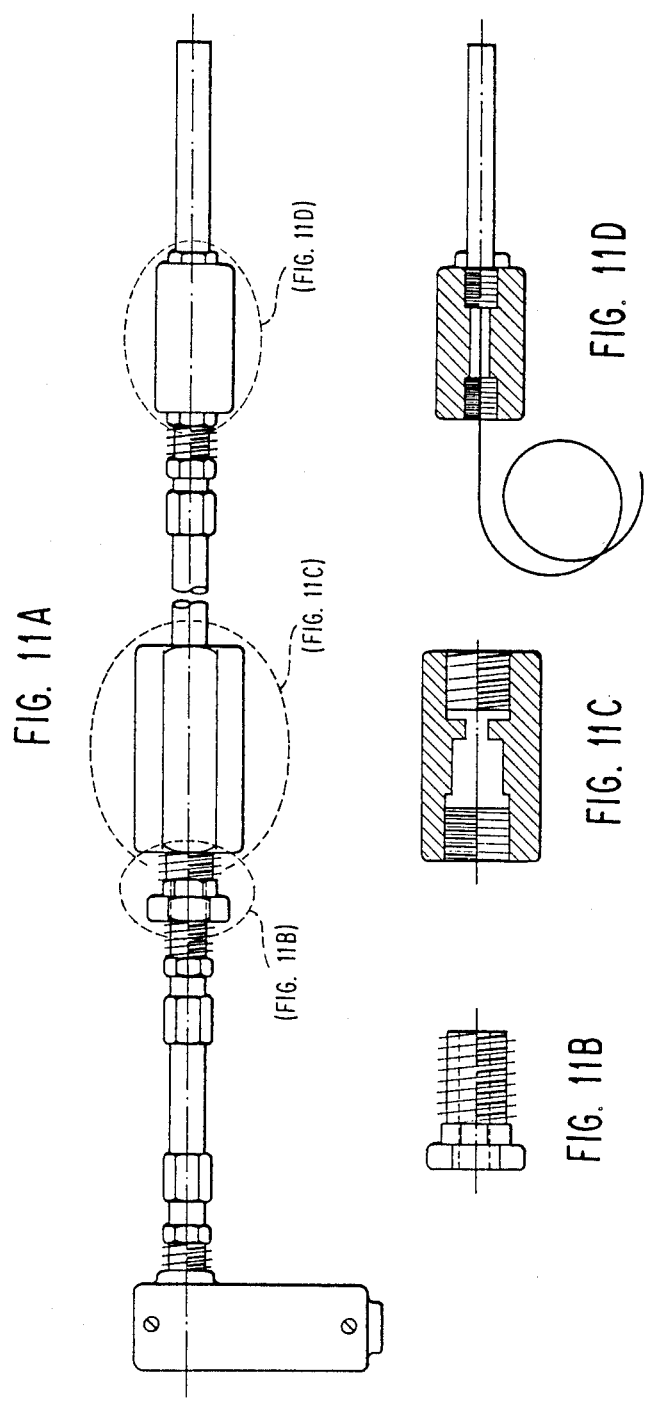

ELECTRONIC CONTROLLER BY RESISTIVITY OF WATER-OIL INTERFACE

BACKGROUND OF THE INVENTION

The present invention relates to the electronic instrumentation field applied to industrial processes, specifically those related with dehydration of light, heavy and extraheavy crude oils.

One of the variables to be controlled in the dehydration of crudes, is the interface level between the petroleum and water, which is defined as the limit in which these two liquids join together due to the difference in density. In general, this level is controlled by instruments of the pneumatic and electronic type. These devices efficiently control the interface level in the dehydration process of light crudes but not in that of the heavy and extraheavy ones, due to certain characteristic factors such as: temperature, emulsion degree, solids contents and the very small difference in the specific gravity between the crude and water; which adversely influence the performance of the control devices. Among the instruments of the pneumatic and electronic types which are commonly used to control this level, we can mention the following: Pressure differential, Floaters, ultrasonic, capacitive or with thermal resistivity devices. However, as stated before, in the dehydration of heavy and extraheavy crudes there are certain factors which adversely influence performance of the interface level controllers used up to this moment, such as:

1. The temperature is a very important factor in the dehydration process, since, in order to achieve a good separation of the crude and the water, it is required to apply a certain amount of heat. When there are problems in maintaining this temperature, whether due to failure in the temperature controllers or to deficiencies in the heating equipment, the crude cools and the sensors of the interface level controllers are saturated with the crude, and this makes good performance of the controllers very difficult.
2. A great part of the interface level controllers are adapted to operate under ideal conditions (crude-water). However, in almost all dehydration processes for crudes a so called emulsion factor is present which may be defined as the mixture of two immiscible liquids which do not separate under normal conditions, and which is formed by stirring the two liquids. In oil installations this factor is produced by the mixture of crude and water as these fluids are pumped from underground through the pump and the surface equipment. Once this factor is present, there are failures in the performance and thus large amounts of emulsion crude drain towards the rubbish wells from where recovery is difficult.
3. Another factor which affects the performance of the interface level controllers is the presence of solids which are dragged with the crude which is pumped from underground. Certain interface level controllers have sensors with very limited areas and they fail due to the obstruction of the sensor surfaces by the solids and sediments.
4. The small difference in the specific gravity between the heavy crude produced by the deposits and the water associated with same (which contains certain amount of salt) eliminates the possibility of controlling the interface level in controllers of the hydrostatic pressure and floating differential types.

An interface level controlling system of the pneumatic or electronic type, comprises, generally, three basic elements: the sensor, the controller and the final controlling element. The sensor is the element in contact with the two liquids and it transmits a signal or information to the controller in accordance with the changes in the interface level to be controlled. The controller receives the signal or information sent by the sensors, and makes a comparison with a previously selected value (adjustment point) and transmits a command signal to the final control element. This element, in turn, performs an action which permits the maintenance of the interface level at the site to be controlled.

We must consider as a specific example, the control operation of the interface level in a water, crude and gas separator such as those used in the sites of recollection of petroleum. The mixture of crude, water and gas from the deposit enters the separator where the separating process takes place. The gas is released through the upper part, the water which is heavier deposits in the bottom and the petroleum exits through the medium part. While the process takes place, the water is drained through an automatic valve operated by the controller, maintaining in this way the interface level in the site required by the operation.

SUMMARY OF THE INVENTION

To sum up, the invention comprises the construction of an interface level controller, the performing principle of which is based on the difference in the electric resistivity of the liquids.

This particular case refers to the automatic control of the interface level between petroleum and water in order to meet requirements of the dehydration processes.

The crude produced by deposits has a very high electric resistivity, which identifies it as a poorly conducting liquid; on the contrary water associated with same (salt water) is a very good electric conductor and this difference allows the adaptation of an electronic circuit to control the interface level in the dehydration equipments.

BRIEF DESCRIPTION OF THE DRAWINGS

The objects and advantages of the invention will be more apparent in view of the attached claims, the drawings and the following description. In the drawings:

Figure 1:
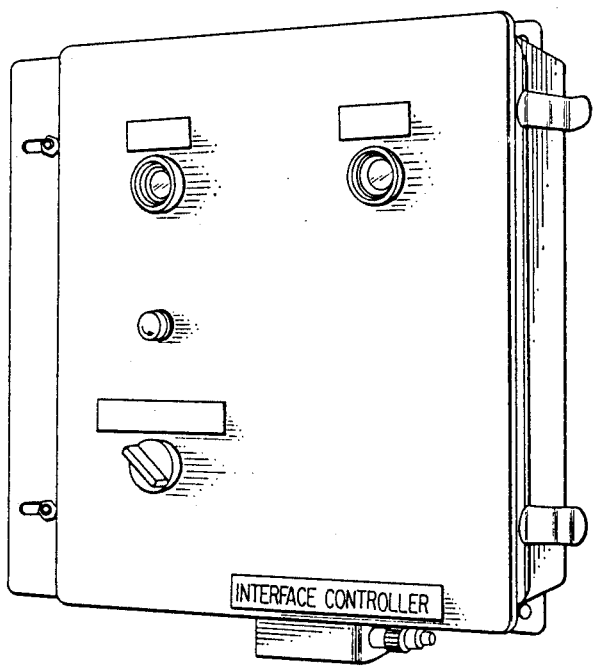
FIGS. 1–4 generally show a preferred embodiment of the invention. Details of the preferred embodiment are shown in the following Figures.
Figure 2:
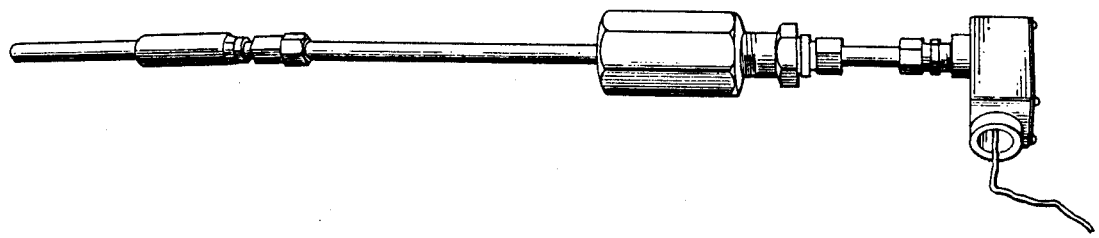
Figure 3:
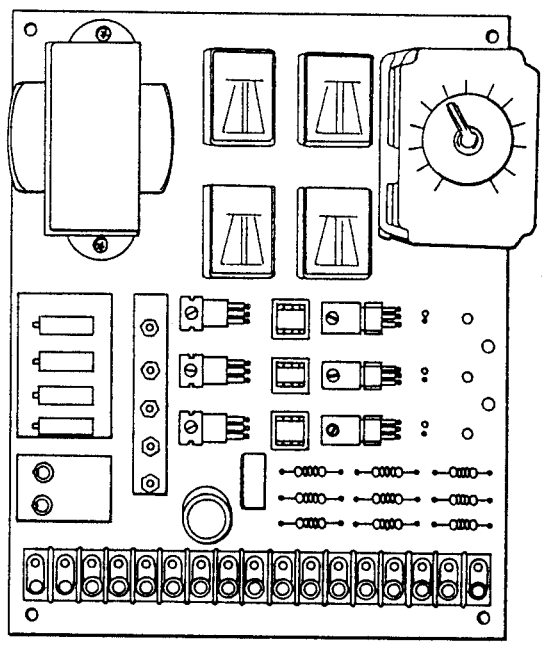
Figure 4:
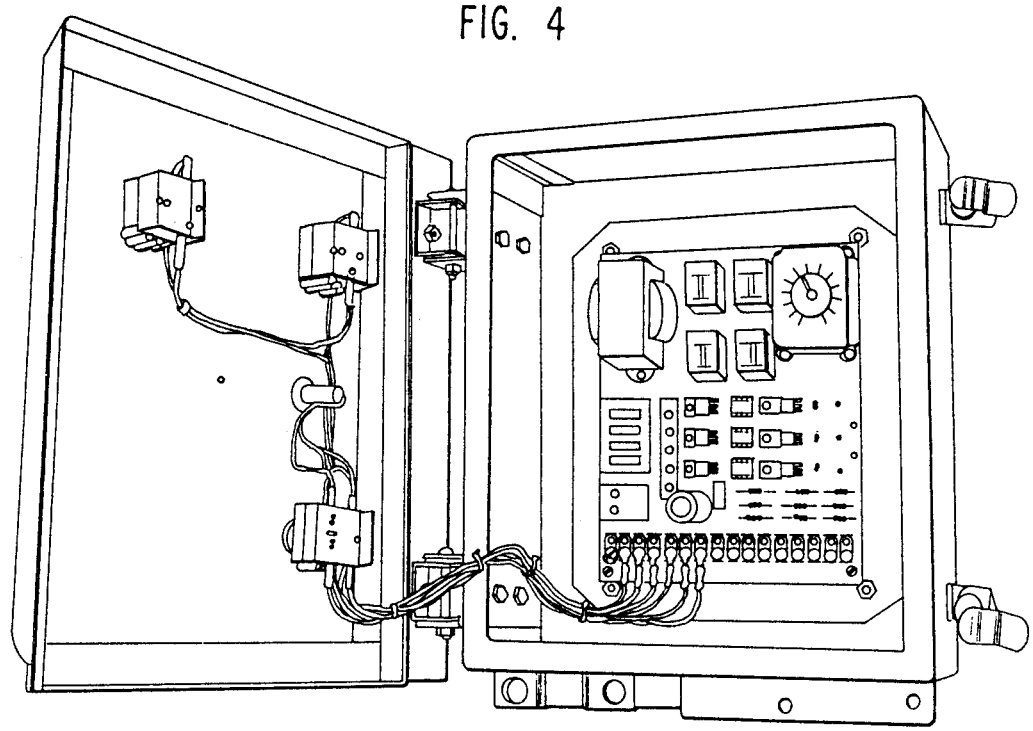
Figure 5:
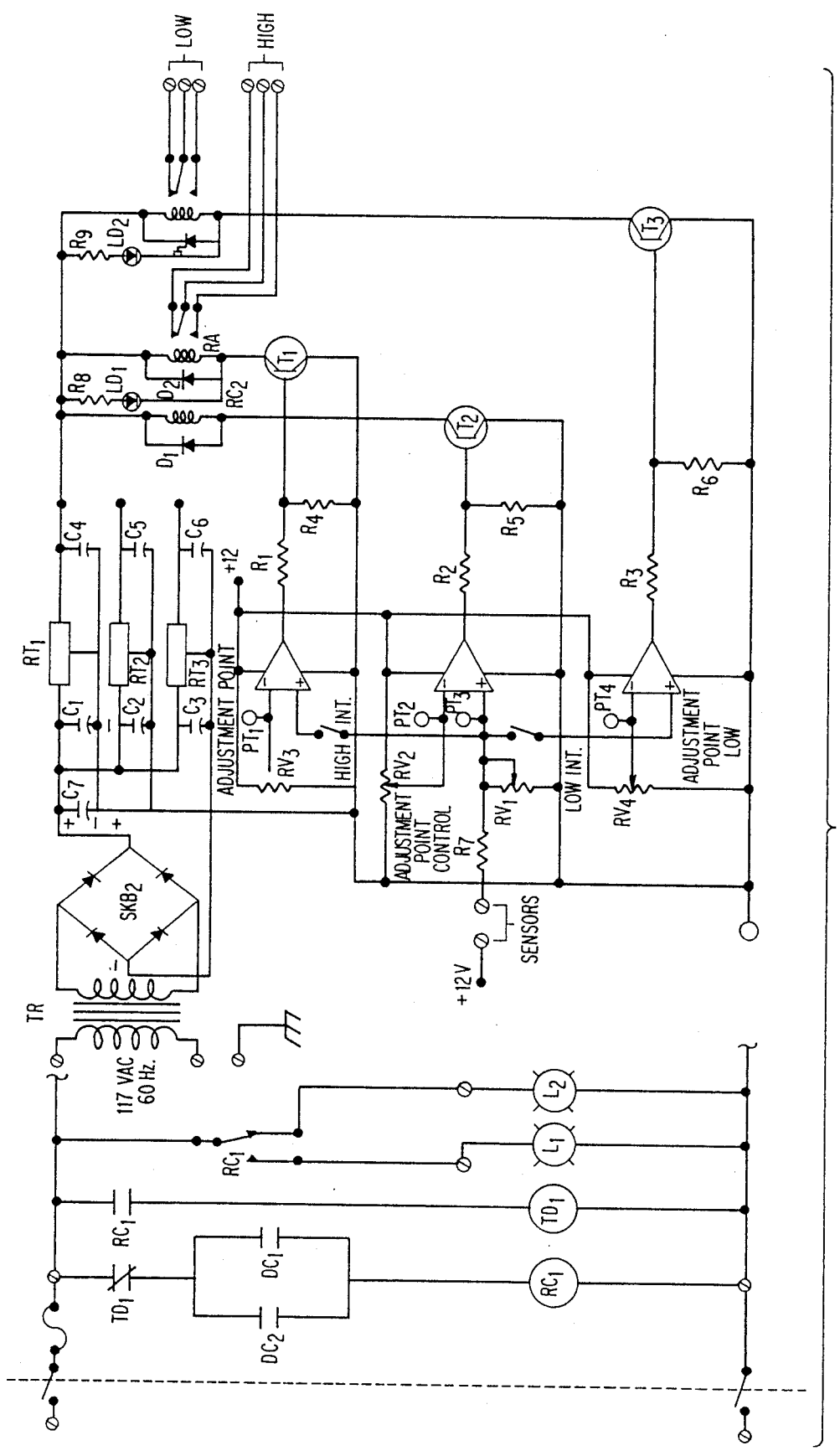
Figure 7:
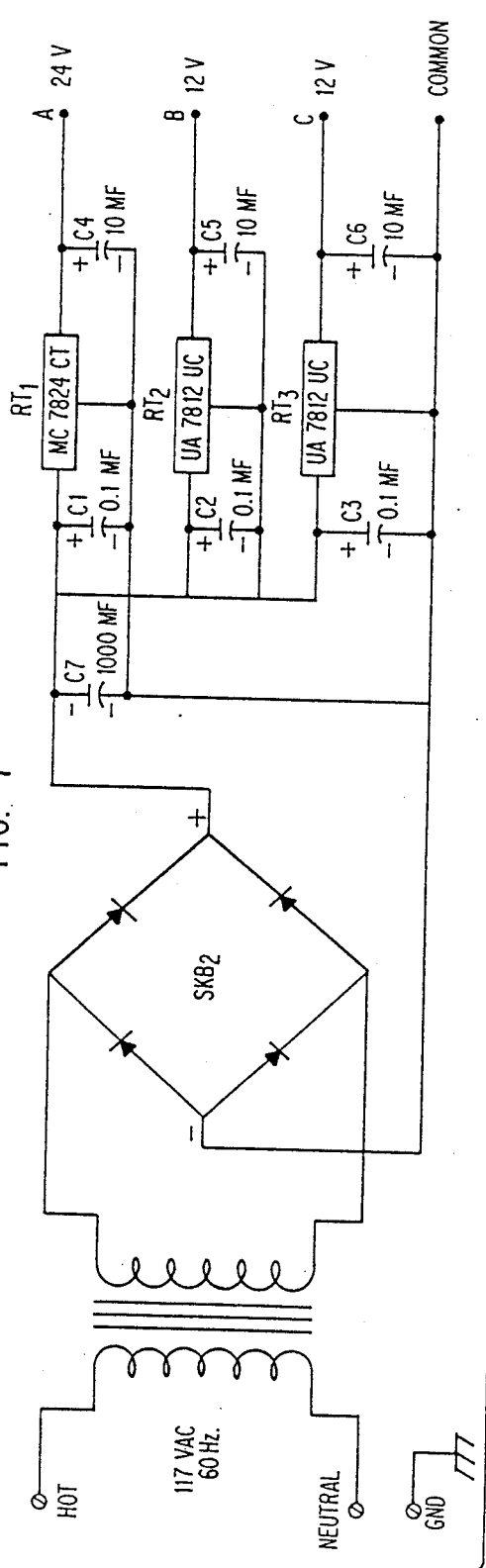
Figure 6:
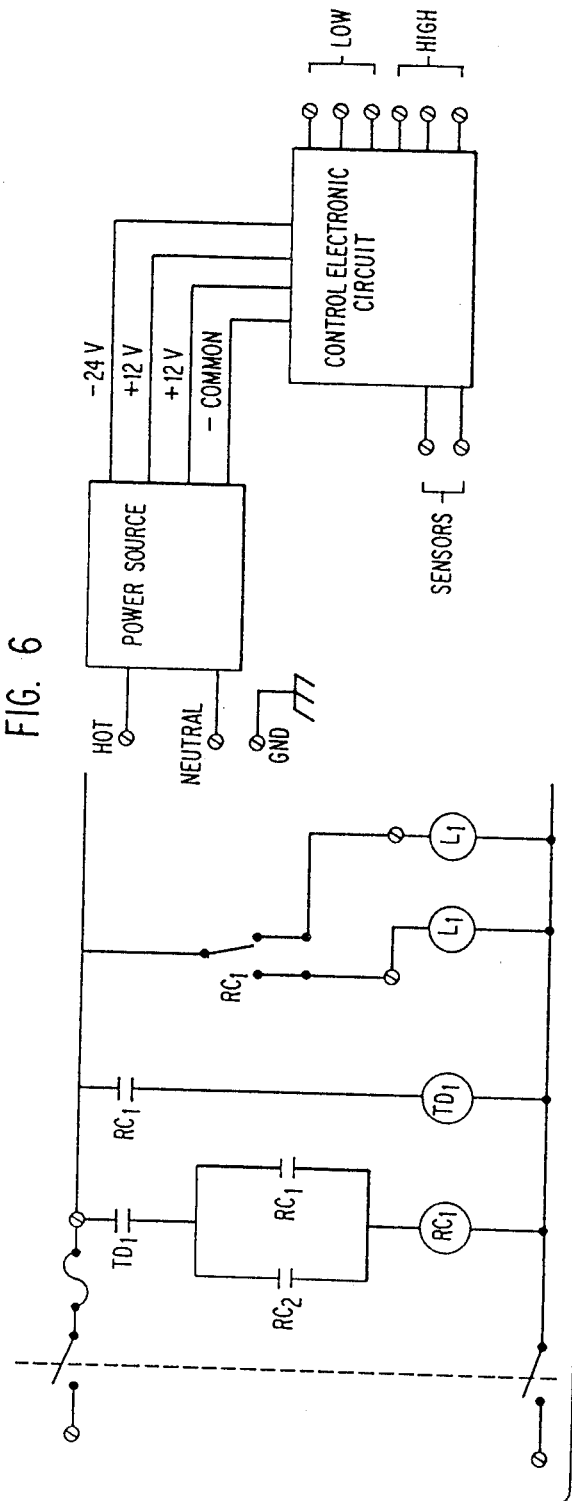
Figure 8:
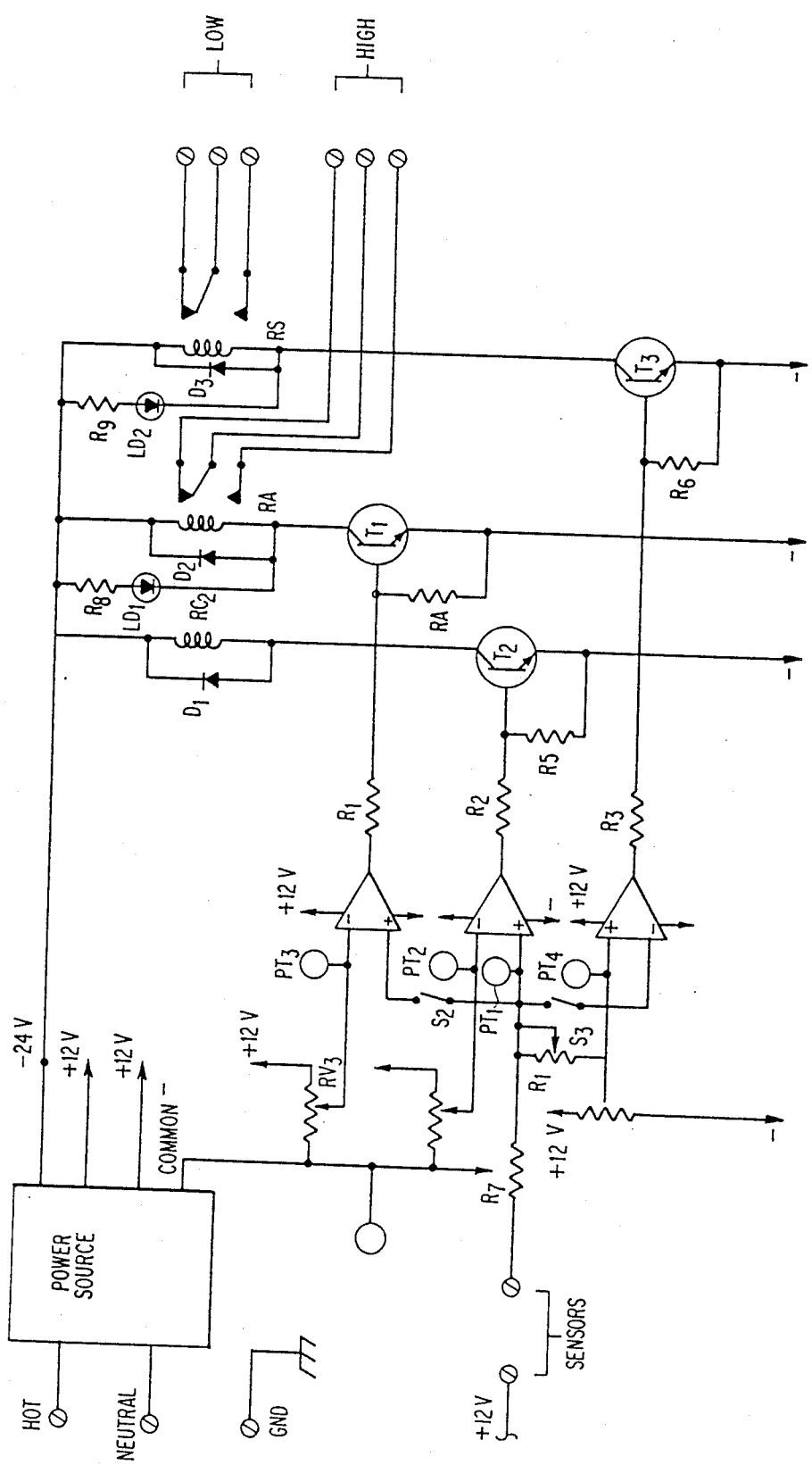
Figure 9:
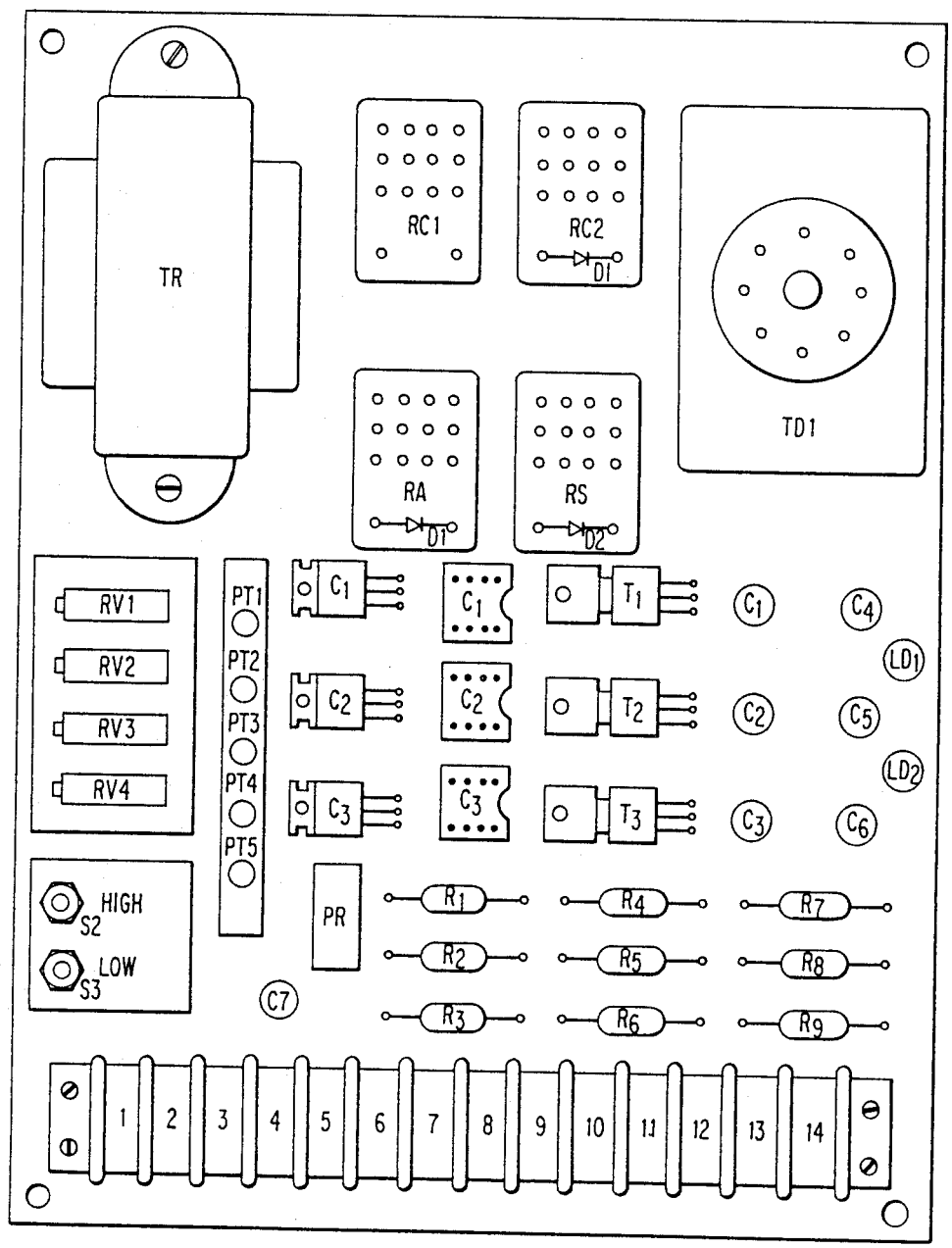

FIG. No. 5 is a general circuit diagram of the preferred embodiment of the interface level controller in accordance with the present invention;

FIG. No. 6 shows the Alternating Current Circuit of the controller of FIG. No. 5 in greater detail;

FIG. No. 7 shows the Power Source Circuit of the controller of FIG. No. 5 in greater detail;

FIG. No. 8 shows the Direct Current Circuit of the controller of FIG. No. 5 in greater detail;

FIG. No. 9 is a diagram of a Controller Card used in connection with the present invention;

FIG. No. 10 is a schematic diagram of the entire interface controller system; and FIG. Nos. 11A, 11B, 11C, and 11D show sensors used in accordance with the present invention.

DETAILED DESCRIPTION OF THE PREFERRED EMBODIMENT

FIG. No. 1 shows the device for the automatic control of the interface level in the dehydration process of according to the present invention. The electric and electronic parts which form the circuit of the control are assembled in a box with electric panels such as the one shown, which measurements are: 20 cm. width, 30 cm height and 10 cm. deep. Its characteristics depend on the area classification of the industrial process, in accordance with the provisions established for the electric installations.

FIG. No. 2 shows the sensor used for the transmission of the signal or information to the controller depending on the changes in the interface level to be controlled. The construction details, as well as the description and amount of materials used in its construction are seen in FIG. Nos. 11A, 11B, 11C and 11D which refer to the assembling of the sensor.

FIG. No. 3 is a view of the controller card wherein the electronic parts which constitute the present invention can be seen. More details of this card may be seen in the FIG. No. 9 which refers to the assembling of the control circuit, as well as the description and amount of materials used.

FIG. No. 4 is a view of the controller panel or box and the location of the control card as well as the disposition of the wires and other components. More details of this Figure are shown in schematic diagram No. 6.

FIG. No. 5 corresponds to the general circuit of the interface level controller. The description which follows will permit the understanding of the function performed by each component of this circuit, as well as the manner in which they carry out the corresponding controlling action.

The referred control circuit will be divided into three sections as shown in schematic diagrams 2, 3 and 4, which we will call the alternating current circuit, the power source and the direct current, respectively circuit.

ALTERNATING CURRENT CIRCUIT

Composed by: current breaker $S_1$, charging relay $RC_1$ timer $TD_1$ and the indicator lights $L_1$ and $L_2$ (Schematic diagram No. 2) the function of the alternating current circuit is the provision of the required relay contacts for the operation of devices such as: solenoids, pump starters, alarms, etc. The power supply of this circuit is 100 volts AC, which is supplied at Nos. 1 and 2 of the terminal block; the line entering terminal No. 1 is the hot one and the one entering No. 2 is neutral.

By means of a double pole breaker $S_1$ located between both lines, the circuit current may be connected or disconnected when desired. The fuse $F_1$, located in the hot line protects its components against overcurrent.

The charging relay coil $RC_1$ is energized through the closed contacts 1–4 of the temporizer $TD_1$ and contacts 5–9 of the controlling relay $RC_2$ when these are closed. The coil $RC_2$ is located in the direct current circuit (Diagram No. 4) and its function will be explained in detail hereinbelow. Once the coil $RC_1$ is energized, this remains selfsupported when contacts 7-11 of $RC_1$ are closed. At the same time contacts 10–6 in $RC_1$ close and energize the temporizer $TD_1$ which activates the timing means which permits the application of a delay variable action on the coil of $RC_1$ from 0 to 180 seconds. Contacts 9–5 of $RC_1$ will remain closed as long as the relay in $RC_1$ is energized which supplies an output of 100 VAC between terminal No. 5 and the neutral line No. 3. This action is used to operate external devices (solenoids, pump starters, alarms, etc.). Lamps $L_1$ and $L_2$ will indicate the activated or non activated condition through contacts 9–5 and 9–1 of relay $RC_1$.

POWER SOURCE

FIG. No. 7 corresponds to the power source used to feed the electronic devices of the direct current circuit, and is basically composed of: step-down transformer TR, rectifier bridge $SKB_2$ and the voltage regulators $RT_1$, $RT_2$ and $RT_3$.

The transformer TR receives in the primary 117 volts from the alternating current circuit which are reduced in the secondary to 25,2 volts AC. This voltage is rectified by the complete wave bridge $SKB_2$, thus obtaining a direct current voltage which is not regulated by the condenser terminals $C_1$, which is of 40 volts DC. The voltage regulator $RT_1$ is used to fix a positive voltage of 24 volts DC at point A of the source, also regulators $RT_2$ and $RT_3$ fix 12 positive volts in points B and C of the same. The voltage outputs in points A, B and C are distributed in the direct current circuit (FIG. No. 8) and the function of each one of them will be explained in detail when said diagram is described. The characteristics of the components which integrate the source are given in the list of materials of the same diagram.

DIRECT CURRENT CIRCUIT

FIG. No. 8 is the schematic representation of the electronic circuit of the controller which is constituted by the operational amplifiers $CI_1$, $CI_2$ and $CI_3$, transistors $T_1$, $T_2$ and $T_3$, control relay $RC_2$, alarm relays RA and RB and potentiometer RV1, RV2, RV3 and RV4.

As explained before, the power source (schematic No. 4) provides the voltages required to feed the different components of the circuit. Output A (+24 VDC) of the source is connected to one of the ends of the relay coils $RC_2$, RA and RB and the other end is connected to the transistor transmitters $T_1$, $T_2$ and $T_3$. Output B (+12 VDC) is used to feed the operational amplifiers $CI_1$, $CI_2$ and $CI_3$ with a positive voltage of 12 VDC in input No. 7 with respect to point No. 4 (common line). This output is also connected to the ends of of the potentiometers RV2, RV3 and RV4, which allow variation of the voltage from 0 to 12 volts DC between the common and the positive line (+12 VDC). Output C (+12 VDC) is used to carry out the control action and high and low level alarms in the operational amplifiers $CI_1$, $CI_2$ and $CI_3$.

The sensors are connected to points 7 and 8 of the terminal block and to one of them is applied +12 VDC (output C of the source). The other sensor is connected to the non-inverting input of the operational amplifier $CI_2$ through the voltage divider formed by R7, and this voltage is regulated by potentiometer $RV_1$. In the non-inverting input of the amplifier (−2) $CI_2$ the reference voltage supplied by output B of the source is fixed, and it can be varied by potentiometer $RV_2$ from 0 to 12 VDC, as desired.

Depending on the conditions of the interface level to be controlled (degree of emulsion in the process), RV1 is varied to obtain a voltage exceeding the reference voltage fixed by RV2, and this condition simplifies an ample range of adjustments in the controller. Each time the variable voltage exceeds the reference voltage, due to the existance of water or emulsion between the two sensors in which the corresponding adjustments were made, the operational amplifier $CI_2$ carries out the comparison between the reference voltage in input $-2$ and the variable in input $+3$ to give a voltage at its output, and this in turn is divided by the resistances $R_2$ and $R_5$ to secure the suitable voltage which makes transistor $T_2$ to commute.

The commutation of transistor $T_2$ allows the control relay coil $RC_2$, which terminals are connected to output A ($+24$ VDC) of the source and transmitter $T_2$ to energize activating contacts 5–9 of $RC_2$, located in the electric circuit (FIG. No. 6) thus completing the corresponding controlling action.

The operational amplifier $CI_1$ is used to provide an alarm action due to a high level in the controller. Its modus operandi is identical to that of amplifier $CI_2$, except in the reference adjustment in the inverting input of both amplifiers; in $CI_1$ this is slightly higher than in $CI_2$. If the voltage in the non-inverting input of $CI_2$ exceeds the previously adjusted value in RV1 (due to failure in the circuit formed by $CI_1$, $T_2$ and $RC_2$), then the comparer $CI_1$ provides a voltage output which makes the transistor $T_1$ commute, which in turn energizes the relay coil RA. The contacts in this relay are used to activate remote devices which indicate an alarm condition due to high level.

The normally closed, commonly and normally open contacts of RA are connected to the points identified with numbers 12, 13, and 14 of the terminal block. Diode LED $LD_1$ is used to locally indicate the alarm condition in the controller.

The operational amplifier $CI_3$ is used to provide an alarm action due to low level in the controller. Its modus operandi differs from that of amplifiers $CI_1$ and $CI_2$ since the reference voltage is fixed at the non-inverting input ($+3$) and the variable at the inverting input ($-2$).

In normal operational conditions, the voltage in the inverting input ($-2$) in CIII always be higher than the reference voltage at the non-inverting input ($+3$). When this is lower than the reference value due to the resistivity of the liquid between the two sensors (non emulsified petroleum), the operational amplifier $CI_3$ makes the comparison, thus providing a voltage output which makes transistor $T_3$ commute, which, in turn, energizes the relay coil RB. The contacts in this relay are used to activate remote devices which indicate a low level alarm condition.

The normally closed, commonly and normally open contacts in RB are connected to the points identified with numbers 9, 10 and 11 of the terminal block. Diode LED $LD_2$ is used to a locally indicate the alarm condition due to low level in the controller.

FIG. No. 9 represents the assembling of the controller circuit and it shows the arrangement of the electric and electronic components which form the controller. These are fixed to a sheet which is insulating material of 16 cm wide and 20 cm. long. The connections among the components are made at the back of the sheet through electric conductors. Their characteristics are given in the list of materials attached to the diagram.

FIG. No. 10 is a typical representation of the external connections to the controller, and it indicates the arrangement of the wiring in the terminal block. In point Nos. 1 and 2 the voltage AC (117 VAC) is connected which feeds the controller. In points 3 and 5 the external source is connected (solenoids, pump starters, alarms, etc.), and the controller supplies 117 volts AC in these two points. The lower sensor is connected to terminal No. 6 and the top one in No. 7. Points 9, 10 and 11 are a part of the contacts of the high level alarm relay (RA), and these are connected to external devices which indicate the alarm condition due to low and/or high levels in the process.

Diagram No. 7 shows the assembling of the sensor used in the interface level controller as well as details of its constituent parts. The sensor point (7) is a stainless steel bar 316 of ¼ inch diameter and 4 inches long. One of its ends is connected to an electric conductor No. 16 (see FIG. 11D) and it reaches the electric joints box (8) through the internal cavity of the mechanized component (1) and the sensor body (5) where it interconnects with the electric conductor coming from the terminal block of the controller. The sensor bar and the sensor body are threaded to an insulating material component (6). The orifice through which the electric conductor passes in the insulating material as well as the connectors (4) are filled with a sealing paste in order to avoid leakage through the threads and the internal cavity of the insulating material. The piece or retractible mechanism (1) allows the introduction or extraction of the sensory surface without having to stop the process. This mechanism is composed by a mechanized component (1) (see FIG. 11C) and the screw of the tow cloth clamp (3). In the internal cavity of the mechanism (1) there are four teflon rings which provide the necessary seal when the sensor is subject to pressure during the process. The screw in the tow cloth clamp (3) when fastened, compresses the teflon rings in the cavity of the mechanism against the tube or body of the sensor (5), creating the corresponding seal.

The length of the sensor depends on the container and the site in which the interface level will be controlled. It can be installed in vertical, horizontal or inclined positions. The parts or components which constitute the sensor are given in the same assembly diagram (FIG. Nos. 11A, 11B, 11C, 11D) along the with the amount of material used are as follows.

| QUANTITY | PART NO. | DESCRIPTION |
|---|---|---|
| | | RELAY |
| | | TRANS.117/25 VAC.1A |
| | | RECTIFIER |
| | | DIODE |
| | | TRANSISTOR |
| | | AMPLIFIER |
| | | POTENTIOMETER 100K |
| | | POTENTIOMETER 1M |
| | | VOLTAGE REGULATOR 24 VOC. |
| | | VOLTAGE REGULATOR 12 VOC. |
| | | CONDENSATOR 1000 MF 63 V |
| | | CONDENSATOR 0.1 MF 35 V |
| | | CONDENSATOR 10 MF 35V |
| | | RESISTANCE 100K 5% ¼ W |
| | | RESISTANCE 10K 5% ¼ v |
| | | RESISTANCE 3.3K 5% ¼ W |
| | | RELAY |
| | | TEMPORIZED RELAY 120 VAC. 0-180" |
| | | MINIATURE SOCATE |
| | | 8 PINES SOCATE |
| | | LED DIODE |

| Part No. | List of Parts | Materials | Ref. Des |
|---|---|---|---|
| CMB-38-70000 | Temporized relay | Potter and Brumfield | $TD_1$ |
| $XB_2$-BC21 | Switch | Telemecanique | |
| $XB_2$-BV66 | Red Lamp | Telemecanique | $L_1$ |
| $XB_2$-BV63 | Green Lamp | Telemecanique | $L_2$ |
| KHU-17012 | Relay | Potter and Brumfield | $RC_1$ |
| TAG | Fuse | Walter | |

| Part No. | Description | Materials | Ref. Des |
|---|---|---|---|
| KHU 17011 | Relay | Potter and Brumfield | RA RE $RC_2$ |
| F57X | Trans. 117/25 VAC. 1A | Triad Utrad | TR |
| SKB-04 | Rectifier | Semicro | PR |
| IN4007 | Diode | Texas Instruments | D1D2 |
| GE 634-1 | Transistor | General Electric | T1T2T3 |
| LM 741 | Amp. | Texas Instruments | |
| 3006P CN | Pot. 100K | Bourns | |
| 3006P | Pot. 1M | Bourns | PV.1 |
| MC 7800 | Voltage Regulator | Motorola | RT1 |
| MC 7800 | Voltage Regulator | Motorola | RT1RT2 |
| 82 M | Conden. 1000 MF 63 V. | Siemens | C7 |
| 221-DT | Conden. 0.1 MF 35 V. | Siemens | C1C2C3 |
| 221-DT | Conden. 10 MF 35 V. | Siemens | C4C5C6 |
| | Resist. 100K 5% ¼ W | Film | R7 |
| | Resist. 10K 5% ¼ W | Film | R123456 |
| | Resist. 3.3K 5% ¼ W | Film | R8R9 |
| KHU 17A12 | Relay | Potter and Brumfield | RC1 |
| CHB 38-70000 | Relay 120 VAC 0-186 seg | Potter and Brumfield | TD |
| 27E006 | Socate Miniature | Potter and Brumfield | |
| 27E122 | Socate 8 Pines | Potter and Brumfield | |
| HLMP-1100 | Diode LED | Hewlett Packard | LD1LD2 |

| | |
|---|---|
| 1 | The tension supply must be provided with an external switch and must be duly protected. |
| 2 | The controller supplies the necessary tension to the external charge (soenoid). |
| 3 | Low Level Alarm. Relay contacts. |
| 4 | High Level Alarm. Relay Contacts |

LEGEND
Control Relay 1
Control Relay 2
Temporizer
High Alarm Relay
Low Alarm Relay
Transformer

FIGS. 11A, 11B, 11C, 11D

| Description | Materials |
|---|---|
| Mechanized part | Acero 304 |
| Thermocouple connemtor ¼" × ¼" | Parker Acero Inoxidable |
| Screw of the tow cloth clamp | Acero 304 |
| Straight connector ¼" × ¼ | Parker Acero Inoxidable |
| Tube 0 ¼" | Acero Inoxidable |
| Insulating Bar | Teflon |
| Sensor Bar ¼" 0 × 4" | Acero 316 |
| Electric joints box | |

-continued

| Description | Materials |
|---|---|
| Safety screws ¼" UNF | |

Having described the nature of the present invention and determined the manner in which it must be practiced, the following is claimed as the property and exclusive right:

1. An electronic interface controller comprising:
   sensor elements for generating a signal representative of current flow therebetween when said elements are disposed in conductive liquids providing an interface to be controlled;
   first means, responsive to a current flow signal from said sensor elements, for generating a control signal according to the conductivity of liquid in contact with said sensor elements;
   a timer for delaying a control signal from said first means for a delay period between 0 and 180 seconds;
   second means, responsive to a current flow signal from said sensor elements, for generating a high interface level alarm signal when the conductivity of liquid in contact with said sensor elements exceeds a predetermined high interface level value; and
   third means, responsive to a current flow signal from said sensor elements for generating a low interface level alarm signal when the conductivity of liquid in contact with said sensor elements is below a predetermined low interface level value.

2. An electronic interface controller as claimed in claim 1, further comprising fourth means for adjustably setting said high interface level value, and fifth means for adjustably setting said low interface level value.

3. An electronic interface controller as claimed in claim 2, wherein said first means, said second means, and said third means each comprise an operational amplifier.

4. An electronic interface controller as claimed in claim 3, wherein said fourth and fifth means comprise potentiometers.

5. An apparatus for indicating high and low levels of an interface between two conductive liquids by comparing signals representative of an interface level of the liquids with reference values, said apparatus comprising:
   sensor means including sensor elements for generating an interface level signal representative of the resistivity of conductive liquids between said elements;
   first comparing means for comparing a received interface level signal from said sensor means with a high level reference value signal and generating a high level alarm signal when the received interface level signal exceeds said high level reference value signal;
   first adjusting means for setting the value of said high level reference signal to a desired value;
   second comparing means for comparing a received interface level signal from said sensor means with a low level reference value signal and generating a low level alarm signal when the received interface level signal fails to exceed said low level reference value signal; and second adjusting means for setting the value of said low level reference signal to a desired value.

6. An apparatus as claimed in claim 5, wherein said first and second comparing means each comprise an operational amplifier and said first and second adjusting means each comprise potentiometers, said first adjusting means being adjustable between 0 and 12 volts DC.

7. An apparatus as claimed in claim 5, further comprising:
 control means for receiving an interface level signal from said sensor means and generating a control signal based upon said received interface level signal; and
 timer means for delaying a control signal from said control means for a delay period.

* * * * *